(12) United States Patent
Moon et al.

(10) Patent No.: US 6,741,297 B2
(45) Date of Patent: May 25, 2004

(54) CONTROL SIGNAL PART AND LIQUID CRYSTAL DISPLAY INCLUDING THE CONTROL SIGNAL

(75) Inventors: Kung-Ha Moon, Suwon (KR); Soo-Kyung You, Cheonan (KR); Je-Whan Whang, Yongin (KR); Young-Ik Kim, Yongin (KR); Sun-A Park, Seoul (KR); Seo-Young Kim, Bucheon (KR)

(73) Assignee: Samsung Electronics Co., Ltd., Suwon (KR)

( * ) Notice: Subject to any disclaimer, the term of this patent is extended or adjusted under 35 U.S.C. 154(b) by 141 days.

(21) Appl. No.: 09/940,429

(22) Filed: Aug. 29, 2001

(65) Prior Publication Data

US 2002/0054004 A1 May 9, 2002

(30) Foreign Application Priority Data

Aug. 29, 2000 (KR) ......................................... 2000-50548

(51) Int. Cl.[7] .............................. G02F 1/141; G09G 3/36
(52) U.S. Cl. ............................................ 349/37; 349/54
(58) Field of Search ........................... 349/37, 149, 152, 349/192, 54; 345/87

(56) References Cited

U.S. PATENT DOCUMENTS

| 5,949,396 | A | * | 9/1999 | Lee ............................... 345/87 |
| 5,963,188 | A | * | 10/1999 | Kim ............................. 345/98 |
| 6,064,363 | A | * | 5/2000 | Kwon ........................... 345/98 |
| 6,124,840 | A | * | 9/2000 | Kwon ........................... 345/100 |
| 6,262,702 | B1 | * | 7/2001 | Murade ......................... 345/87 |
| 6,388,719 | B1 | * | 5/2002 | Matsunaga et al. ........... 349/40 |

* cited by examiner

Primary Examiner—Toan Ton
Assistant Examiner—David Chung
(74) Attorney, Agent, or Firm—McGuireWoods LLP

(57) ABSTRACT

The present invention provides a control signal part and a liquid crystal display including the control signal part in which damage to wires due to electrolysis is prevented. A high voltage redundancy wire(s) is formed at one side or both sides of a high voltage signal wire, thereby to form equipotential around the high voltage signal wire. The control signal part includes a first signal wire that transmits a first signal voltage, a second signal wire that transmits a second signal voltage smaller than the first signal voltage, and a first redundancy wire that transmits the same voltage as the first signal voltage. The first redundancy wire is formed between the first signal wire and the second signal wire. The control signal part may also include a second redundancy wire that transmits the same voltage as the first signal voltage. Herein, the first redundancy wire is located at one side of the first signal wire and the second redundancy wire is located at the other side of the first signal wire.

37 Claims, 11 Drawing Sheets

CONTROL SIGNAL PART AND LIQUID CRYSTAL DISPLAY INCLUDING THE CONTROL SIGNAL

BACKGROUND OF THE INVENTION (a) Field of the Invention

The present invention relates to a control signal part and a liquid crystal display including the control signal part.

(b) Description of the Related Art

A liquid crystal display is one of the flat display devices widely used at the present time. The liquid crystal display includes two substrates in which a plurality of electrodes are formed, a liquid crystal layer sandwiched between the two substrates, and two polarizing films for polarizing the light attached to each outward surface of the substrates. The liquid crystal display controls the light transmittance, so as to display picture images by applying different voltages to the electrodes while forming electric fields for varying the orientation of the liquid crystal molecules of the liquid crystal layer. In such a liquid crystal display, thin film transistors are formed in one of the two substrates, which is called a TFT substrate, and the thin film transistors switch the voltages applied to the electrodes.

A display region for displaying picture images is situated in the center of the TFT substrate. A plurality of signal lines, or a plurality of gate lines and data lines are formed in the horizontal and vertical directions, respectively. The gate lines and the data lines cross each other, thereby defining a plurality of pixel element regions. Each pixel element has a pixel electrode to which the data signal is applied via the data line. The thin film transistor sends the data signal transmitted via the data line to the pixel electrode by the gate signal transmitted via the gate line.

A plurality of gate pads connected to the gate lines and a plurality of data pads connected to the data lines are formed outside of the display region. These pads are connected to the external driving integrated circuits and receive gate signals and data signals from the external driving integrated circuits. In addition, the pads send the signals to the gate lines and the data lines.

A printed circuit board for gate signal transmission and a printed circuit board for data signal transmission are attached to the thin film transistor substrate using an anisotropic conducting film through a heat-compression process so as to send the gate signals and the data signals to the thin film transistor.

The thin film transistor and the printed circuit board for data signal transmission are connected by a data signal transmission film on which the data driving integrated circuit is mounted. The data driving integrated circuit converts an electric signal into a data signal and sends the data signal to the data line. Also, the thin film transistor and the printed circuit board for gate signal transmission are connected by a gate signal transmission film on which the gate driving integrated circuit is mounted. The gate driving integrated circuit converts an electric signal into a gate signal and sends the gate signal to the gate line.

Herein, gate control signals for controlling the gate signal may be output from the printed circuit board for data transmission instead of from the printed circuit board for gate transmission. And these gate control signals may be transmitted to the gate signal transmission film. In such a case, gate control signal wires are formed on the data signal transmission film which is connected to the printed circuit board for data signal transmission and gate control signal connection wires corresponding to the gate control signal wires are formed on the thin film transistor substrate. Then, the gate control signal wires of the data signal transmission film are connected to gate control signal connection wires of the thin film transistor. Accordingly, the gate control signals are transmitted to the gate driving integrated circuit on the gate signal transmission film from the data signal transmission film.

The gate control signals are various kinds of control signals such as a gate-on-voltage, a gate-off-voltage and a common voltage for reference voltage to the differences of the data voltages in the thin film transistor.

These gate control signals input into the gate driving integrated circuit, while driving the liquid crystal display, have various magnitudes of voltage and are transmitted through gate control signal connection wires. The gate control signal connection wires are arranged abreast and closely on the thin film transistor substrate. Accordingly, a high voltage signal wire transmitting a high voltage such as the gate-on-voltage and a low voltage signal wire transmitting a low voltage such as the gate-off-voltage are arranged abreast and closely.

In this arrangement of the wires, a potential difference is formed between the high voltage signal wire and the low voltage signal wire while driving the liquid crystal display. This potential difference causes an electrolysis reaction when moisture permeates into the wires during the manufacture and operation of the liquid crystal display. As a result, damage is caused to the high voltage signal wire, and this damage results in the production of inferior devices.

SUMMARY OF THE INVENTION

It is an object of the present invention to provide a control signal part and a liquid crystal display including the control signal part which prevent the damage of wires due to electrolysis.

This object is provided, according to the present invention, by forming high voltage redundancy wire(s) at one side or both sides of a high voltage signal wire, thereby to form equipotential around the high voltage signal wire.

According to one aspect of the present invention, a control signal part includes a first signal wire transmitting a first signal voltage, a second signal wire transmitting a second signal voltage smaller than the first signal voltage, and a first redundancy wire transmitting the same voltage as the first signal voltage. The first redundancy wire is formed between the first signal wire and the second signal wire. The control signal part may also include a second redundancy wire that transmits the same voltage as the first signal voltage. Herein, the first redundancy wire is located at one side of the first signal wire and the second redundancy wire is located at the other side of the first signal wire.

The first redundancy wire may be connected to the first signal wire or separated from the first signal wire. At least one of the first redundancy wire and the second redundancy wire may be connected to the first signal wire. And both the first redundancy wire and the second redundancy wire may be separated from the first signal wire.

The first redundancy wire may be formed by less oxidative conductive materials than conductive materials for forming the second signal wire. Also, the first redundancy wire may be formed by conductive materials such as one from the copper family, silver family, chromium family, or molybdenum family, including nitride chromium and nitride molybdenum. In the alternative, the first redundancy wire may be formed by ITO or IZO.

According to another aspect of the present invention, a liquid crystal display includes a display region, which includes a gate line, a data line crossing the gate line thereby defining a pixel element region, a thin film transistor connected to the gate line and the data line in the pixel element region, and a pixel electrode electrically connected to the thin film transistor; a driving integrated circuit part including a gate driving integrated circuit for outputting a gate signal to the gate line and a data driving integrated circuit for outputting a data signal to the data line; a control signal part for controlling the driving integrated circuit part, the control signal part including a first signal wire transmitting a first signal voltage, a second signal wire transmitting a second signal voltage smaller than the first signal voltage, and a first redundancy wire transmitting the same voltage as the first signal voltage, where the first redundancy wire is formed between the first signal wire and the second signal wire.

The control signal part may further include signal wires for driving the gate driving integrated circuit. Even further the control signal part may include signal wires for driving the data driving integrated circuit.

The first signal voltage may be a gate-on-voltage or a power supply voltage, and the second signal voltage may be a gate-off-voltage or a ground voltage.

A second redundancy wire that transmits a voltage equivalent to the first signal voltage may be included. Herein, the first redundancy wire is located at one side of the first signal wire, and the second redundancy wire is located at the other side of the first signal wire.

The first redundancy wire may be connected to the first signal wire, or separated from the first signal wire. And at least one of the first redundancy wire and the second redundancy wire may be connected to the first signal wire. Moreover, the first redundancy wire and the second redundancy wire may be separated from the first signal wire.

The first redundancy wire may be formed by less oxidative conductive materials than conductive materials for forming the second signal wire. Also, the first redundancy wire may be formed by conductive materials such as one from the copper family, silver family, chromium family, or molybdenum family, including nitride chromium and nitride molybdenum. The first redundancy wire may be formed by ITO or IZO.

And the first redundancy wire may be formed by conductive materials for forming the gate line, the data line, or the pixel electrode.

The first signal wire may have a wire structure in which a first wire is connected to a second wire. Herein, the first wire is connected to the gate driving integrated circuit and the second wire is connected to the data driving integrated circuit. The first wire may be formed by conductive materials for forming the gate line or the data line and the second wire may be formed by conductive materials for forming the data line or the gate line.

The first redundancy wire may have a wire structure in which a first wire is connected to a second wire. Herein, the first wire is connected to the gate driving integrated circuit and the second wire is connected to the data driving integrated circuit. The first wire may be formed by conductive materials for forming the gate line or the data line and the second wire may be formed by conductive materials for forming the data line or the gate line.

The signal wires of the control signal part may include a lower wire having a pad and may be formed by conductive materials for forming the gate line. The signal wires of the control signal part may further include a first insulating layer covering the lower wire, a first contact hole exposing one end of the lower wire, and an upper wire having a pad and being formed by conductive materials for forming the data line. Herein, the upper wire is connected to the lower wire through the first contact hole. Also, the signal wires of the control signal part may further include a second insulating layer covering the upper wire, a second contact hole exposing the pad of the upper wire, and a third contact hole exposing the pad of the lower wire, and an auxiliary pad covering and being connected to the pads of the lower and the upper wires through the second and third contact holes.

BRIEF DESCRIPTION OF THE DRAWINGS

A more complete appreciation of the invention, and many of the advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will be explained with reference to the accompanying drawings.

Figure 1:
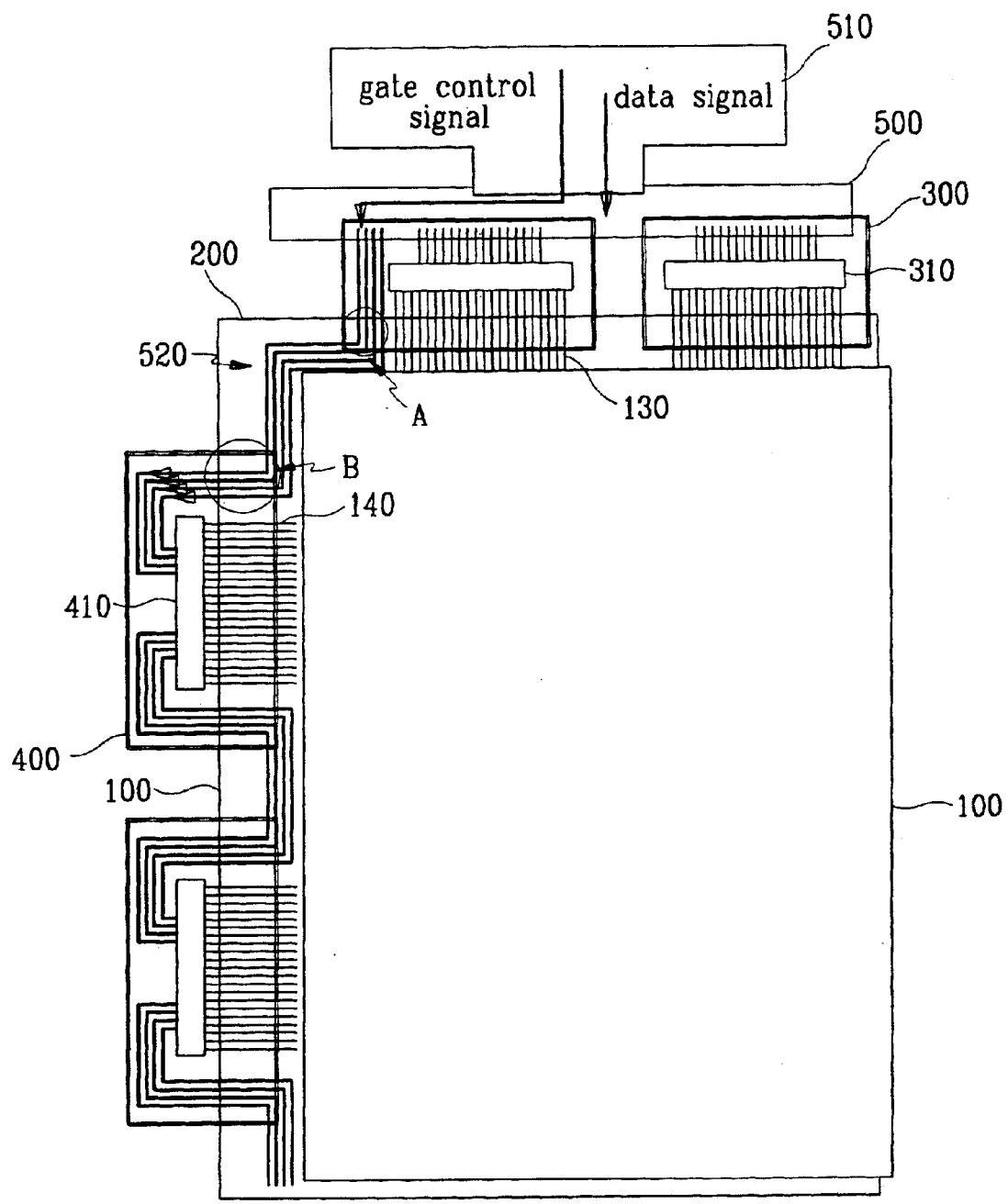
FIG. 1 is an outline view of a liquid crystal display including a control signal part.

FIG. 1 is an outline view of a liquid crystal including a control signal part formed on the thin film transistor.

A color filter substrate 100 is combined with a thin film transistor substrate 200. A data driving integrated circuit 310 for outputting data signals to data lines 130 and a gate driving integrated circuit 410 for outputting gate signals to gate lines 140 are situated outside of the thin film transistor substrate 200. The data driving integrated circuit 310 is mounted on a data signal transmission film 300, which is connected to a printed circuit board for data signal transmission 500 and the thin film transistor substrate 200 electrically. And the gate driving integrated circuit 410 is mounted on a gate signal transmission film 400, which is connected to the thin film transistor substrate 200 electrically.

The gate transmission film 300 and the data transmission film 400 are electrically connected to the thin film transistor substrate 200 using an anisotropic conducting film (ACF) through a heat and compression process. Herein, leads formed in the films 300 and 400 are electrically connected to wires formed in the thin film transistor substrates 200 in a one-to-one correspondence through conductive materials (not shown) of the ACF.

Gate control signals for controlling the driving of the gate driving integrated circuit 410 are transmitted to the gate driving integrated circuit 410 via gate control interconnection wires 520. In gate control interconnection wires 520, wires of a printed circuit board for data signal transmission 500, control signal leads of the data signal transmission film 300, control signal wires of the thin film transistor substrate 200, and control signal leads of the gate signal transmission film 400 are connected to each other electrically. Arrows on the gate control interconnection wires 520 show the transmission direction of the gate control signals.

The gate control signals are gate-on-voltage (Von), gate-off-voltage (Voff), common voltage for reference voltage to the differences of the data voltages in the thin film transistor (Vcom), gate clock (CPV), start vertical signal (STV), line reverse signal (RVS), gate on enable (OE), grounding voltage (VGND), etc. These gate control signals control the driving of the gate driving circuit 410.

Of these gate control signals, each of the gate-on-voltage and the power supply voltage is 10 V to 20 V, while each of the gate-off-voltage and the grounding voltage is below 0 V.

A high voltage signal wire for transmitting a high voltage such as the gate-on-voltage and a low voltage signal wire for transmitting a low voltage such as gate-off-voltage are arranged closely. In such a case, a potential difference is formed between the two wires during the operation of the liquid crystal display. The potential difference is equivalent to a voltage difference between the high voltage such as the gate-on-voltage and the low voltage such as the gate-off-voltage.

Moisture permeates into the wires while the liquid crystal display is manufactured or operated, especially in a moist environment. More specifically, the moisture permeates into the wires at the location where the gate transmission film 300 and the data transmission film 400 are attached to the thin film transistor 10, and concentrates on the step difference parts of the wires.

The moisture in itself has ions. Anions of the ions move to the high voltage signal wire from the low voltage signal wire through the moisture by the potential difference between the high voltage signal wire and the low voltage signal wire.

The high voltage signal wire reacts with the anions electrochemically, and is thereby melted in the moisture. As a result, the high voltage signal wire opens due to electrolysis.

Such an opening of the wires, which is due to the electrolysis, generates in the wires at the location where the gate transmission film 300 and the data transmission film 400 are attached to the thin film transistor 10, especially in the wires indicated as "A" and "B". The present invention proposes a wiring structure that forms an equipotential around the high voltage signal wire so as to prevent damage to the high voltage signal wire due to the electrolysis. In the present invention, a wiring structure, or a high voltage redundancy wire, is formed between the high voltage signal wire and the low voltage signal wire. The redundancy wire transmits the same voltage as the high voltage signal wire.

In such a case, a potential difference between the high voltage signal wire and the low voltage signal wire is formed so that the high voltage redundancy wire may be damaged due to electrolysis. However, since an equipotential is formed between the high voltage redundancy wire and the high voltage signal wire, the damage of the high voltage signal wire due to electrolysis does not occur.

This will be explained with reference to the following drawings.

FIG. 2 to FIG. 5 are drawings showing a structure of selected gate control signal wires located at the attachment part of a data signal transmission film 300 and the thin film transistor substrate 200.

Figure 2:
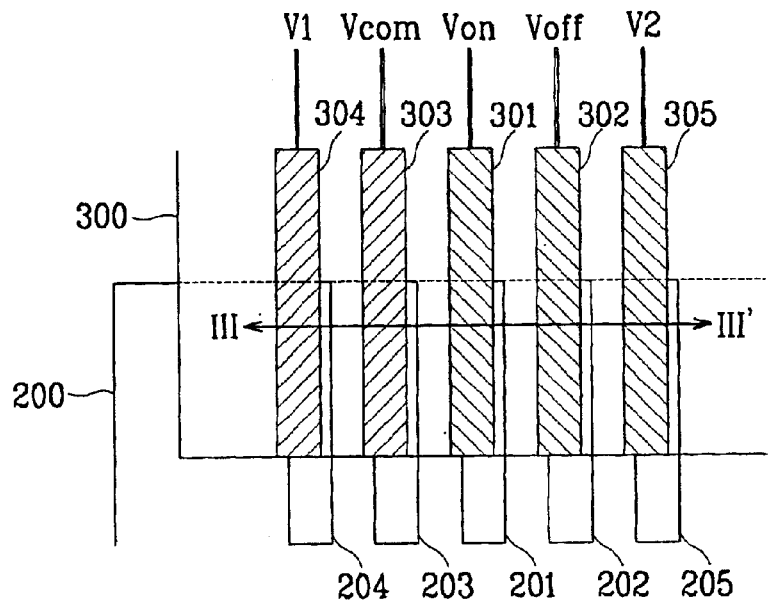
FIG. 2 is a plan view showing a wiring structure of a control signal part in which a high voltage redundancy wire is not formed.
Figure 3:
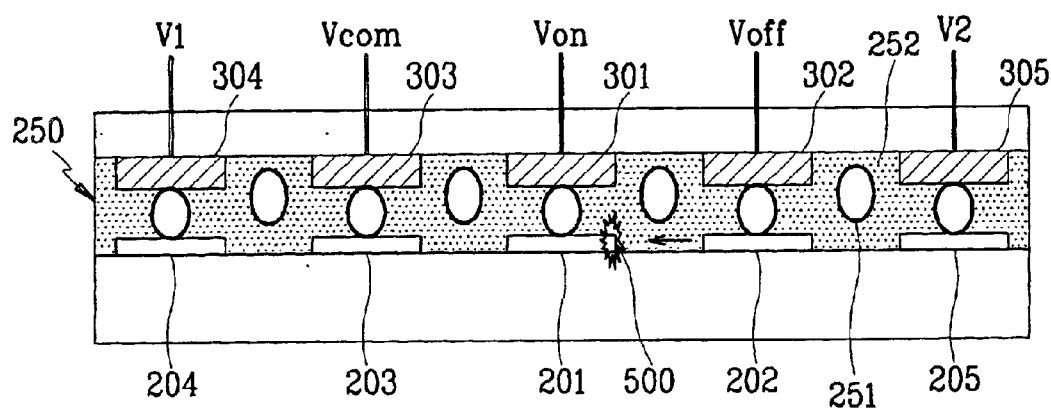
FIG. 3 is a cross-sectional view of the wiring structure of the control signal part taken along the line III–III' of FIG. 2.

FIG. 2 is a plan view showing a wiring structure of gate control signal leads 301, 302, 303, 304, and 305 of the data signal transmission film 300 and gate control signal wires 201, 202, 203, 204, and 205 of the thin film transistor substrate 200 in which a high voltage signal wire and a low voltage signal wire are arranged closely. FIG. 3 is a cross-sectional view of the wiring structure taken along the line III–III' of FIG. 2.

A thin film transistor substrate 200 with gate control signal wires 201, 202, 203, 204, and 205 is attached to a data signal transmission film 300 with gate control signal leads 301, 302, 303, 304, and 305 using an anisotropic conducting film (ACF), which includes conductive materials and an adhesive resin. Leads of the film 300 are electrically connected to wires of the thin film transistor substrates 10 in a one-to-one correspondence through conductive materials (not shown) of the ACF.

In the data signal transmission film 300, a low voltage control lead 302 is located at one side of a high voltage signal lead 301, and a gate common voltage signal lead 303 is located at the other side of the high voltage signal lead 301. A high voltage of about 20 V, such as a gate-on-voltage is applied to the high voltage control lead 301, a low voltage of below 0 V, such as a gate-off-voltage is applied to the low voltage control lead 302, and a gate common voltage of about 3 V is applied to the gate common voltage lead 303.

Moreover, a high voltage signal wire 201, a low voltage signal wire 202, a gate common voltage signal wire 203, and other signal wires 204 and 205, which are connected to the leads 301, 302, 303, 304 and 305 in a one to one correspondence, are formed on the thin film transistor substrate 200.

To drive a liquid crystal display, the gate control signals are input into a gate driving integrated circuit (not shown) via the signal leads 301, 302, 303, 304 and 305 of the data signal transmission film 300, the signal wires 201, 202, 203, 204, and 205 of the thin film transistor substrate 200, and the leads of a gate signal transmission film (not shown).

In this process, the gate-on-voltage is applied to the high voltage signal lead 301 and the high voltage signal wire 201, and the gate-off-voltage is applied to the low voltage signal lead 302 and the low voltage signal wire 202. Accordingly, a potential difference is formed between the high voltage signal lead 301/the high voltage signal wire 201 and the low voltage signal lead 302/the low voltage signal wire 202. The potential difference is equivalent to the voltage difference between the gate-on-voltage and the gate-off-voltage.

Moisture permeates into the wires while the liquid crystal display is manufactured or operated, especially in a moist environment. More specifically, the moisture permeates into the wires at the location where the gate transmission film 300 and the data transmission film 400 are attached to the thin film transistor 200. The moisture concentrates on the step difference parts of the wires.

The moisture in itself has ions. Anions 500 of the ions move to the high voltage signal wire 201 from the low voltage signal wire 202 through the moisture by the potential difference between the high voltage signal wire 201 and the low voltage signal wire 202. The high voltage signal wire 201 reacts with the anions 500 electrochemically, and is thereby melted in the moisture. As a result, the high voltage signal wire 201 opens due to electrolysis.

However, when an equipotential is formed around the high voltage signal wire 201 by forming high voltage redundancy wire(s) that transmit the same voltage as the high voltage signal wire 201 at one side or both sides of the high voltage signal wire 201, the damage of the high voltage signal wire 201 due to the electrolysis may be prevented.

Figure 4:
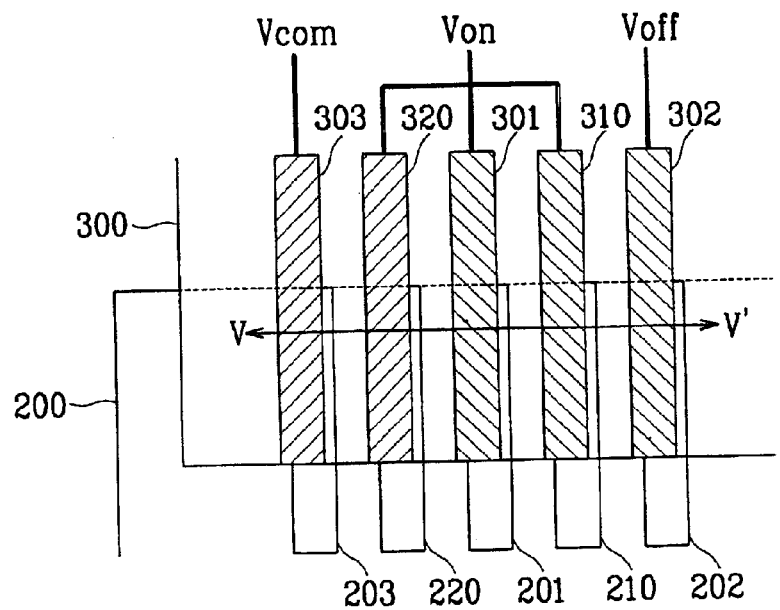
FIG. 4 is a plan view of a control signal part according to a first embodiment of the present invention.
Figure 5:
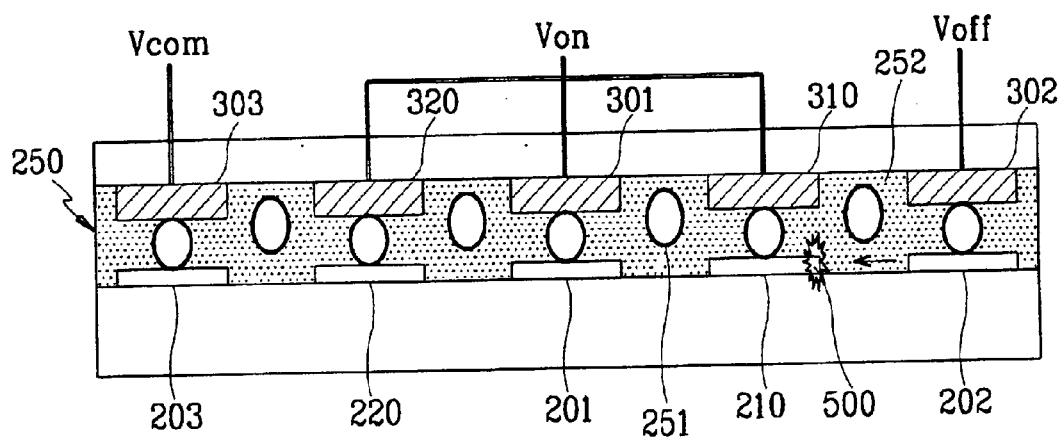
FIG. 5 is a cross-sectional view of the control signal part taken along the line V–V' of FIG. 4.

FIG. 4 is a plan view of a control signal part according to a first embodiment of the present invention, and FIG. 5 is a cross-sectional view of the control signal part along the line V–V' of FIG. 4.

A data signal transmission film 300 with gate control signal leads 301, 302, 303 and high voltage redundancy leads 310 and 320 is attached to a thin film transistor substrate 200 with gate control signal wires 201, 202, 203 and high voltage redundancy wires 210 and 220 using an anisotropic conducting film 250 consisting of conductive materials 251 and an adhesive resin 252. Herein, the wires 201, 202 and 203 of the thin film transistor substrate 200 are electrically connected to the leads 301, 302 and 303 of the data signal transmission film 300 in a one-to-one correspondence through conductive materials 251 of the anisotropic conducting film 250.

In the data signal transmission film 300, the high voltage redundancy leads 310 and 320, which transmit the same voltage as the high voltage signal lead 301, are formed at both sides of the high voltage signal lead 301, which transmits a gate-on-voltage. A low voltage signal lead 302, which transmits a gate-off-voltage, is formed at one side of the high voltage redundancy lead 310, and a common voltage signal lead 303, which transmits the gate common voltage, is formed at one side of the other high voltage redundancy lead 320. The high voltage signal lead 301 is located between the two high voltage redundancy leads 310 and 320.

In addition, a high voltage signal wire 201, a low voltage signal wire 202, a common voltage signal wire 203, and the high voltage redundancy wires 210 and 220 are connected to leads 301, 302, 303, 310 and 320 in a one-to-one correspondence.

To drive a liquid crystal display, the gate control signals are input into a gate driving integrated circuit (not shown) via the signal leads 301, 302 and 303 of the data signal transmission film 300, the signal wires 201, 202 and 203 of the thin film transistor substrate 200 and leads of a gate signal transmission film (not shown).

In this process, an equipotential is formed between the high voltage signal wire 201/the high voltage signal lead 301 and the high voltage redundancy wire 210/the high voltage redundancy lead 310. This occurs because the same voltage is applied to both the high voltage signal wire 201/the high voltage signal lead 301 and the high voltage redundancy wire 210/the high voltage redundancy lead 310. Also, a low voltage such as the gate-off-voltage is applied to the low voltage signal wire 202/the low voltage signal lead 302, and a high voltage such as the gate-on-voltage is applied to the high voltage signal wire 201/the high voltage signal lead 301. Accordingly, a potential difference equivalent to a voltage difference between the gate-on-voltage and the gate-off-voltage is formed between the low voltage signal wire 202/the low voltage signal lead 302 and the high voltage signal wire 201/the high voltage signal lead 301.

Moisture permeates into the wires while the liquid crystal display is manufactured or operated, especially in a moist environment. More specifically, the moisture permeates into the wires at the location where the gate transmission film 300 and the data transmission film 400 are attached to the thin film transistor 200 and concentrates on the step difference parts of the wires.

The moisture in itself has ions. Anions 500 of the ions move to the high voltage redundancy wire 210 from the low voltage signal wire 202 through the moisture by the potential difference between the high voltage redundancy wire 210 and the low voltage signal wire 202. The high voltage redundancy wire 210 reacts with the anions 500 electrochemically, and is thereby melted in the moisture. As a result, the high voltage redundancy wire 210 opens due to an electrolysis.

However, an equipotential forms between the high voltage signal wire 201 and the high voltage redundancy wires 210 and 220. This occurs because the same voltage is applied to the high voltage signal wire 201 and high voltage redundancy wires 210 and 220. In the circumference of the high voltage signal wire 201 where the equipotential is formed, anions 500 do not concentrate on the high voltage signal wire 201. Instead, the anions float in the moisture at random. Accordingly, the electrochemical reaction of the high voltage signal wire 201 and the anions 500 does not occur. As a result, the high voltage signal wire 201 does not melt.

In other words, the high voltage signal wire 201 is not melted as a result of a sacrifice of the high voltage redundancy wires 210 and 220. Therefore, good wire condition is maintained without damage to the high voltage signal wire 201.

Figure 6:
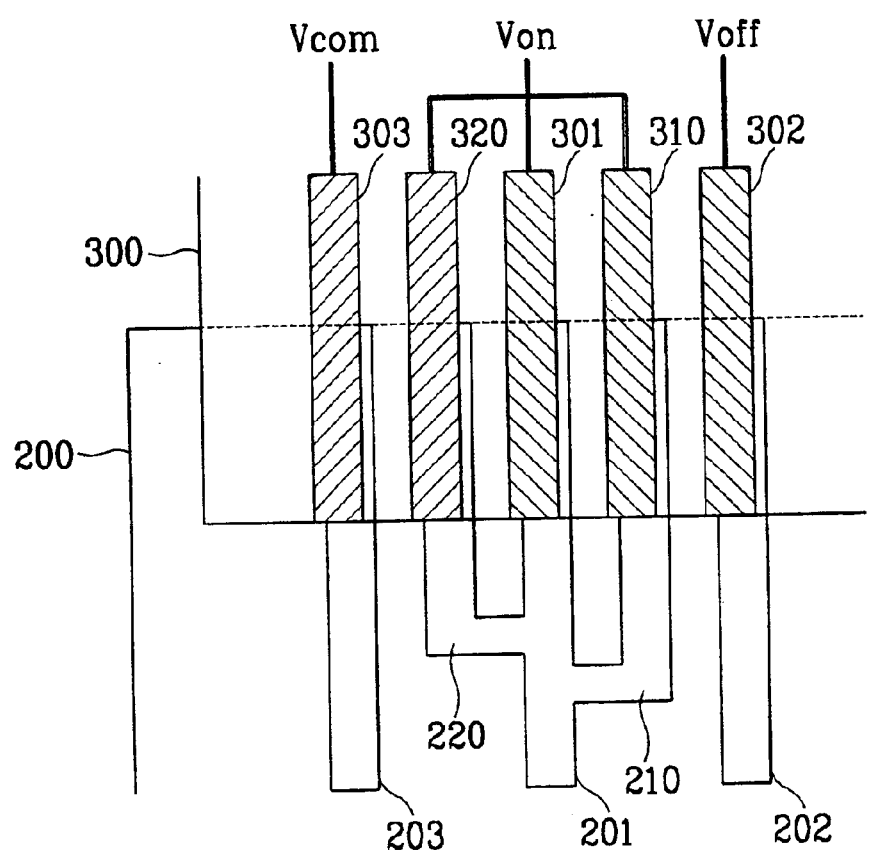
FIG. 6 is a plan view of a control signal part according to a second embodiment of the present invention.

The high voltage redundancy wires 210 and 220 are located at both sides of the high voltage signal wire 201 and are separated from the high voltage signal wire 201 in the first embodiment of the present invention. An equipotential, may also be formed around the high voltage signal wire 201 when at least one wire of the two high voltage redundancy wires 210 and 220 is connected to the high voltage signal wire 201, as shown in FIG. 6. FIG. 6 is a plan view of a control signal part according to a second embodiment of the present invention.

The high voltage redundancy wires 210 and 220 are formed to prevent the electrolysis that may result from the potential difference between the high voltage signal wire 201 and the low voltage signal wire 202. Accordingly, it is possible to form only one high voltage redundancy wire between the high voltage signal wire 201 and the low voltage signal wire 202 when the low voltage signal wire 202 is located at only one side of the high voltage signal wire 201.

In the above described first embodiment of the present invention, the wire transmitting the gate-on-voltage is an example of the high voltage signal wire 201, and the wire transmitting the gate-off-voltage is an example of the low voltage signal wire 202. However, another example of the high voltage signal wire 201 is a wire transmitting a power supply voltage, and another example of the low voltage signal wire 202 is a wire transmitting a grounding voltage.

In short, the present invention prevents damage of the high voltage signal wire 201 from the anions in the moisture permeated in the wire. This is accomplished by using the high voltage redundancy wire, which transmits the same voltage as the high voltage signal wire 201, so as to form an equipotential around the high voltage signal wire 201.

The high voltage redundancy wire may be formed by using conventional conductive materials such as conductive materials for forming gate wire or data wire. Herein, the high voltage redundancy wire may be formed by less oxidative conductive materials than conductive materials for forming the low voltage signal wire 202, such as one from the copper family, silver family, chromium family, or molybdenum family, including nitride chromium and nitride molybdenum. In such a case, the high voltage redundancy wire may be less damaged due to electrolysis. And when the high voltage redundancy wire is formed by oxidized conductive materials such as ITO or IZO, the high voltage redundancy wire may be even less reacted with the anions.

In the above described first and second embodiments of the present invention, only the gate control signal wire, which transmits the gate control signal, is described. However, the present invention is also applied to a case in which a data control signal wire, which transmits the data control signal, is formed on the thin film transistor substrate. Moreover, the present invention could be applied to all cases proposed to prevent the melting of the wire due to the electrolysis caused by the potential difference between two wires.

The description of a liquid crystal display including the above described control signal part is as follows.

Figure 7:
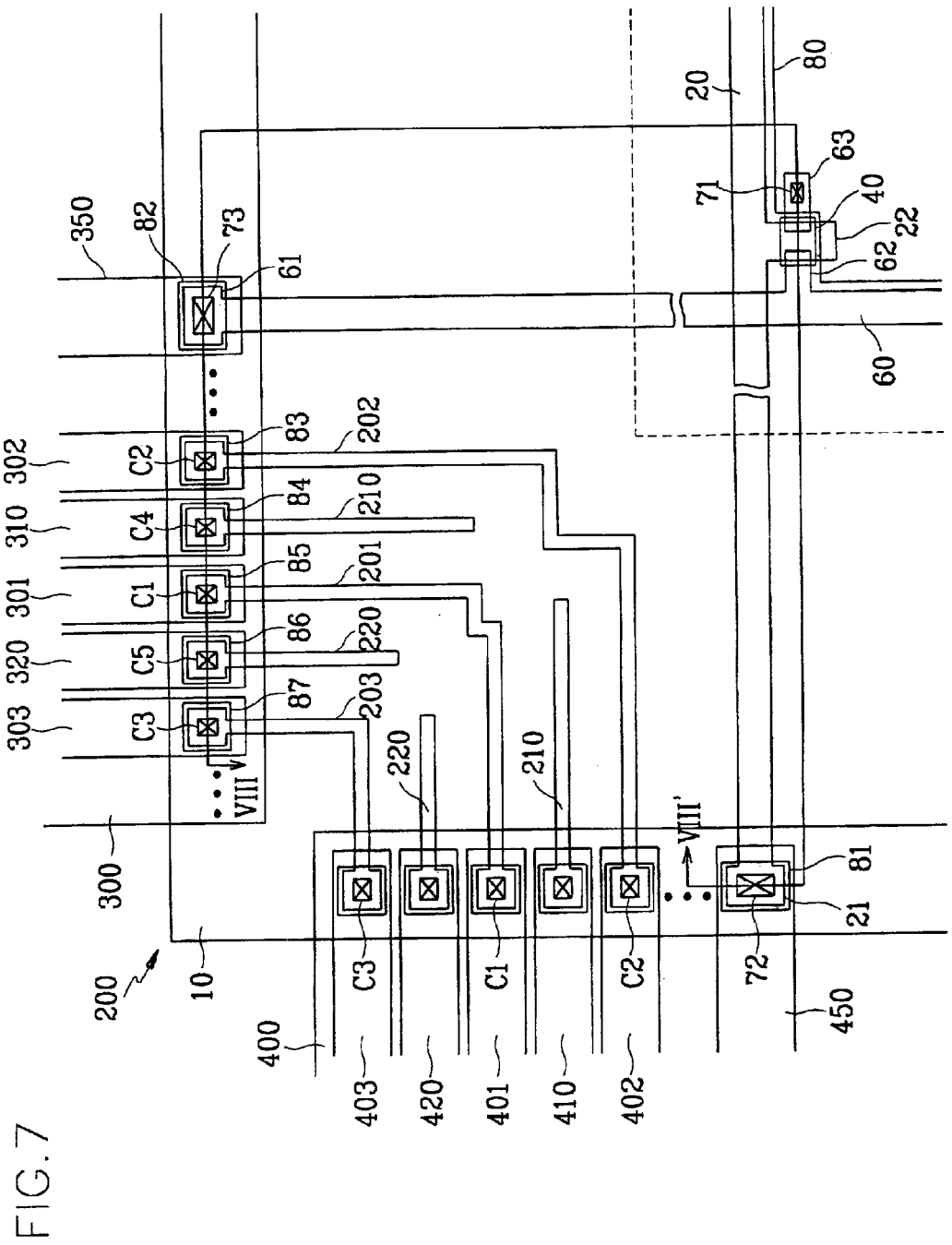
FIG. 7 is a plan view of a liquid crystal display according to a third embodiment of the present invention.
Figure 8:
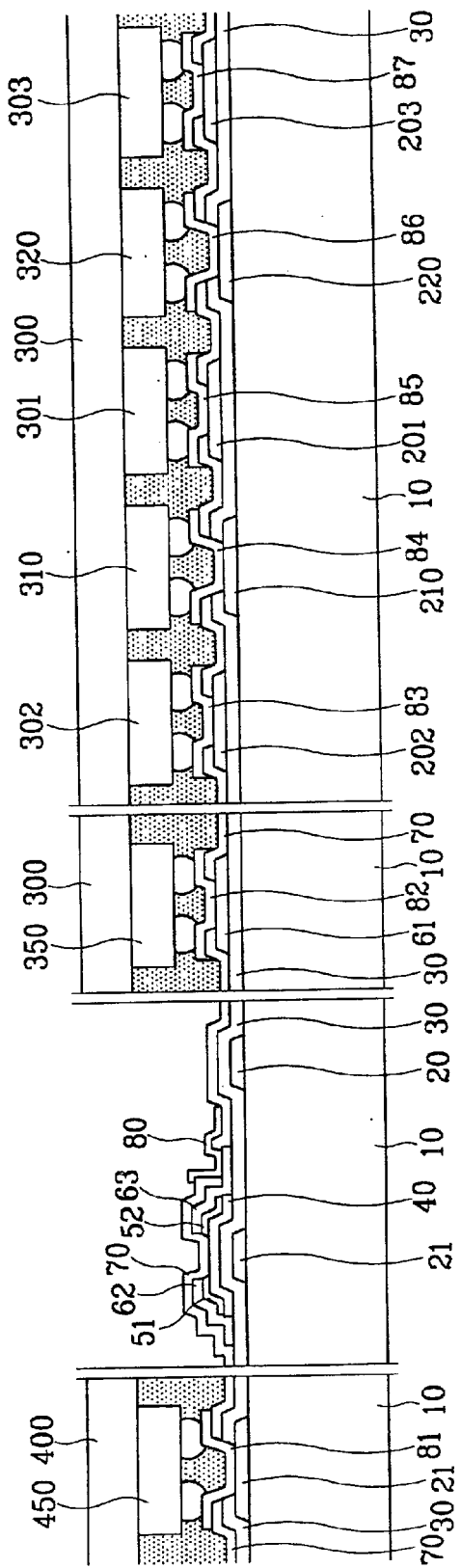
FIG. 8 is a cross-sectional view of the liquid crystal display taken along the line VIII–VIII' of FIG. 7.

FIG. 7 is a plan view of a liquid crystal display according to a third embodiment of the present invention, and FIG. 8 is a cross-sectional view of the liquid crystal display along the line VIII–VIII' of FIG. 7.

In the third embodiment of the present invention, control signal wires for transmitting gate control signals, such as a high voltage signal wire, a low voltage signal wire and a common voltage signal wire, are formed by conductive materials for forming data wire, and high voltage redundancy wires are formed by conductive materials for forming gate wire.

A gate wire 20, 21 and 22, which includes a gate line 20 including a gate electrode 22 and a gate pad 21 connected to the end of the gate line 20, and high voltage redundancy wires 210 and 220 are formed on an insulating substrate 10. Each high voltage redundancy wire 210 and 220 includes a high voltage redundancy wire and a pad connected to the high voltage redundancy wire.

The high voltage redundancy wires 210 and 220 are arranged at both sides of a high voltage signal wire 201 (described later). A high voltage such as a gate-on-voltage is applied to the high voltage redundancy wires 210 and 220. The high voltage redundancy wires 210 and 220 are formed in a pattern of a couple of wires. The couple of high voltage redundancy wires 210 and 220 start from an upper portion and a left portion of the substrate respectively, and extend without being connected to each other.

The gate line 20 extends in a horizontal direction and transmits the gate signal outputted from a gate driving integrated circuit (not shown) to pixel regions.

The gate wires 20, 21 and 22 and the high voltage redundancy wires 210 and 220 may be formed by conventional conductive materials such as one from the copper family, silver family, chromium family, or molybdenum family, including nitride chromium and nitride molybdenum. In addition, the gate wires 20, 21 and 22 and the high voltage redundancy wires 210 and 220 may have a single layer structure or a multi-layer structure.

And a gate insulating layer 30 consisting of insulating materials such as silicon nitride, silicon oxide, etc. is formed to cover the gate wires 20, 21 and 22 and the high voltage redundancy wires 210 and 220.

A semiconductor layer 40 consisting of amorphous silicon is formed on the gate insulating layer 30 and corresponds to the gate electrode 22.

A data wire 60, 61, 62 and 63 and gate control signal wires 201, 202 and 203 are formed on the gate insulating layer 30. The data wire includes a data line 60 extending in a vertical direction and crossing the gate line 20 to define a pixel region, a data pad 61 connected to the end of the data line 60, a source electrode 62 protruding from the data line 60 and being connected to the semiconductor layer 40, and a drain electrode 63 corresponding to the source electrode 61 and being connected to the semiconductor layer 40.

Each gate control signal wire 201, 202 and 203 includes a gate control signal line and gate control signal pads connected to both ends of the gate control signal line.

The ends of the gate control signal wires 201, 202 and 203 may be connected to leads 301, 302 and 303 of a data signal transmission film 300 located at the upper portion of the thin film transistor substrate 200. The other ends of the gate control wires 201, 202 and 203 may be connected to leads 401, 402 and 403 of a gate signal transmission film 400 located at the left portion of the thin film transistor substrate 200.

Because of the above arrangement of the wires, the gate control signals transmitted via the leads 301, 302 and 303 of the data signal transmission film 300 are sent to a gate driving integrated circuit (not shown) via the gate control signal wires 201, 202 and 203 of the thin film transistor substrate 200 and the leads 401, 402 and 403 of the gate signal transmission film 400.

The gate control signal wires 201, 202, 203 include a high voltage signal wire 201, a low voltage signal wire 202 and a common voltage signal wire 203. A high voltage such as a gate-on-voltage is applied to the high voltage signal wire 201, a low voltage such as a gate-off-voltage is applied to the low voltage signal wire 202, and a gate common voltage is applied to the common voltage signal wire 203. The high voltage signal wire 201 is arranged between the high voltage redundancy wires 210 and 220.

The data wire 60, 61, 62, 63 and the gate control signal wires 201, 202, 203 may be formed in a single layer type or a multi-layer type by conductive materials such as one from the copper family, silver family, chromium family, or molybdenum family, including nitride chromium and nitride molybdenum.

Ohmic contact layers 51 and 52, which include amorphous silicon doped with impurities, are formed between the semiconductor layer 40 and the source electrode 62, and between the semiconductor 40 and the drain electrode 63, respectively.

A passivation layer 70 which includes silicon nitride or silicon oxide, is formed on the resultant substrate that includes the data wire 60, 61, 62 and 63, the gate control signal wires 201, 202 and 203 and the semiconductor layer 40.

A contact hole 71, which exposes the drain electrode 63, a contact hole 73, which exposes the data pad 61, and contact holes C1, C2 and C3, which expose the pads connected on both ends of the gate control signal wires 201, 202 and 203, respectively, are formed in the passivation layer 70. And a contact hole 72, which exposes the gate pad 21, and contact holes C4 and C5, which expose the pads of the high voltage redundancy wires 210 and 220, are formed in the passivation layer 70 and the gate insulating layer.

A pixel electrode 80 connected to the drain electrode 61 through the contact hole 71 and located in the pixel region, a gate auxiliary pad 81 connected to the gate pad 21 through the contact hole 72, a data auxiliary pad 82 connected to the data pad 61 through the contact hole 73, auxiliary pads 83, 84, 85, 86 and 87 connected to the pads at both sides of the gate control signal wires 201, 202 and 203 and the high voltage redundancy wires 210 and 220, are formed on the passivation layer 70.

A gate signal transmission film 400 having a gate driving integrated circuit (not shown), a data signal transmission film 300 having a data driving integrated circuit (not shown), the gate control signal leads 301, 302 and 303, and the high voltage redundancy leads 310 and 320, are attached to the above described thin film transistor substrate 200 using an anisotropic conducting film 250.

Data signal lead 350, which transmits the data signal, and gate control signal leads 301, 302 and 303, which transmit the gate control signals for driving the gate driving integrated circuit, are formed in the data signal transmission film 300.

The data signal lead 350 is connected to the data pad 82 to transmit the data signal into the data pad 82, which is connected to the data line 20. And the gate control signal leads 301, 302 and 303 are electrically connected to the pads of the gate control signal wires 201, 202 and 203, which are located at the upper portion of the thin film transistor substrate 200. The gate control leads 301, 302 and 303 transmit the gate control signals into the gate control signal wires 201, 202 and 203.

In the data signal transmission film 300, high voltage redundancy leads 310 and 320, which transmit the same voltage as the high voltage redundancy wires 210 and 220 at both sides of the high voltage signal wires 201, are formed in order to prevent damage to the high voltage signal wire 201 due to electrolysis. The high voltage redundancy leads 310 and 320 and the high voltage redundancy wires 210 and 220 are connected to each other by conductive materials 251 of the anisotropic conducting film 250.

In the gate signal transmission film 400, gate signal lead 450 and gate control signal leads 401, 402 and 403 are formed. The gate control signal leads 401, 402 and 403 receive the gate control signals from the gate control signal wires 201, 202 and 203 of the thin film transistor substrate 200 and send them to the gate driving integrated circuit (not shown). The gate signal lead 450 transmits the gate signal to the gate line 20.

In such a wire arrangement, an equipotential is formed between the high voltage signal wire 201 and the high voltage redundancy wires 210 and 220 located at an upper portion of the substrate during the driving of the liquid crystal display.

The gate control signal leads 401, 402 and 403 are connected to the pads of the gate control signal wires 201, 202 and 203 at the left portion of the thin film transistor substrate 200 and receive the gate control signals via the gate control signal wires 201, 202 and 203. The gate control signals transmitted via the gate control signal leads 401, 402 and 403 of the gate signal transmission film 400 are input to the gate driving integrated circuit (not shown), and the gate control signals control the driving of the gate driving integrated circuit.

The gate control signal lead 450 is connected electrically to the gate pad 82, which is formed on the insulating substrate 10. The gate control signal lead 450 transmits the gate signal output from the gate driving integrated circuit to the gate line 20, which is connected to the gate pad 81.

In the gate signal transmission film 400, high voltage redundancy leads 410 and 420, which transmit the same voltage as the high voltage redundancy wires 210 and 220, are formed at both sides of the high voltage signal wires 201 in order to prevent damage to the high voltage signal wire 201 due to electrolysis. The high voltage redundancy leads 410 and 420 and the high voltage redundancy wires 210 and 220 are connected by conductive materials 251 of the anisotropic conducting film 250.

In such a wire arrangement, an equipotential is formed between the high voltage signal wire 201 and the high voltage redundancy wires 210 and 220 located at the left portion of the substrate during the driving of the liquid crystal display.

To drive a liquid crystal display, the gate control signals are input to a gate driving integrated circuit (not shown) via signal leads 301, 302, 303, 310 and 320 of the data signal transmission film 300, the signal wires 201, 202, 203, 210 and 220 of the thin film transistor substrate 200, and the signal leads 401, 402 403 410 and 420 of a gate signal transmission film (not shown).

In this process, an equipotential is formed between the high voltage signal lead 301/the high voltage signal wire 201 and the high voltage redundancy leads 310 and 320/the high voltage redundancy wires 210 and 220. This occurs because the same voltages are applied to both the high voltage signal lead 301/the high voltage signal wire 201 and the high voltage redundancy leads 310 and 320/the high voltage redundancy wires 210 and 220. Also, a low voltage such as the gate-off-voltage is applied to the low voltage signal lead 302/the low voltage signal wire 202, and a high voltage such as the gate-on-voltage is applied to the high voltage redundancy lead 310/the high voltage redundancy wire 210. Accordingly, a potential difference equivalent to a difference in voltage between the gate-on-voltage and the gate-off-voltage is formed between the low voltage signal lead 302/the low voltage signal wire 202 and the high voltage redundancy lead 310/the high voltage redundancy wire 210.

Moisture permeates into the wires while the liquid crystal display is manufactured or operated, especially in a moist environment. More specifically, the moisture permeates into the wires at the location where the gate transmission film 300 and the data transmission film 400 are attached to the thin film transistor 200 and concentrates on the step difference parts of the wires.

The moisture in itself has ions. Anions of the ions move to the high voltage redundancy wire 210 from the low voltage signal wire 202 through the moisture by the potential difference between the high voltage redundancy wire 210 and the low voltage signal wire 202. The high voltage redundancy wire 210 reacts with the anions electrochemically, thereby to be melted in the moisture. As a result, the high voltage redundancy wire 210 opens due to electrolysis.

However, an equipotential forms between the high voltage signal wire 201 and the high voltage redundancy wires 210 and 220. This occurs because the same voltage is applied to the high voltage signal wire 201 and high voltage redundancy wires 210 and 220. In the circumference of the high voltage signal wire 201 where the equipotential is formed, anions do not concentrate on the high voltage signal wire 201. Instead, the anions float in the moisture at random. Accordingly, the electrochemical reaction of the high voltage signal wire 201 and the anions does not occur. As a result, the high voltage signal wire 201 does not melt.

In other words, the high voltage signal wire 201 is not melted as a result of a sacrifice of the high voltage redundancy wires 210 and 220. Therefore, good wire condition is maintained without damage to the high voltage signal wire 201.

The high voltage redundancy wires 210 and 220 are located at both sides of the high voltage signal wire 201 and are separated from the high voltage signal wire 201 in the third embodiment of the present invention. However, in the present invention, at least one of the two high voltage redundancy wires 210 and 220 may be connected to the high voltage signal wire 201.

In addition, the high voltage redundancy wires 210 and 220 may be formed by connecting two wires. One of the wires may be located at the upper portion of the substrate 10 to be connected to the data signal transmission film 300, and the other wire may be located at the left portion of the substrate to be connected to the gate signal transmission film 400.

The high voltage redundancy wires 210 and 220 are formed to prevent an electrolysis due to the potential difference between the high voltage signal wire 201 and the low voltage signal wire 202. Accordingly, it is possible to form only one high voltage redundancy signal wire between the high voltage signal wire 201 and the low voltage signal wire 202 when the low voltage signal wire 202 is located at only one side of the high voltage signal wire 201.

In the above described third embodiment of the present invention, the wire transmitting the gate-on-voltage is taken as an example of the high voltage signal wire, and the wire transmitting the gate-off-voltage is taken as an example of the low voltage signal wire. However, another example of the high voltage signal wire is a wire transmitting a power supply voltage, and another example of the low voltage signal wire is a wire transmitting a grounding voltage.

In short, the present invention prevents damage to the high voltage signal wire 201 from the anions in the moisture permeated in the wire. This is accomplished by using the high voltage redundancy wire 201 which transmits the same voltage as the high voltage signal wire 201, so as to form an equipotential around the high voltage signal wire 201.

The high voltage redundancy wire may be formed by using conventional conductive materials such as conductive materials for forming gate and data wires. Herein, the high voltage redundancy wire may be formed by less oxidative conductive materials than conductive materials for forming the low voltage signal wire, such as one from the copper family, silver family, chromium family, or molybdenum family, including nitride chromium and nitride molybdenum. In such a case, the high voltage redundancy wire may be less damaged due to electrolysis. And when the high voltage redundancy wire is formed by oxidized conductive materials such as ITO or IZO, the high voltage redundancy wire may be less reacted with the anions.

In the above described third embodiment of the present invention, only the gate control signal wire, which transmits the gate control signal, is described. However, the present invention is also applied to a case in which a data control signal wire, which transmits the data control signal, is formed on the thin film transistor substrate. Moreover, the present invention may be applied to all cases proposed to prevent the melting of the wire due to electrolysis caused by the potential difference between two wires.

In the third embodiment of the present invention, the gate control signal wires 201, 202 and 203, connected to both the data signal transmission film 300 and the gate signal transmission film 400, is formed by conductive materials for forming the data wire. However, the gate control signal wires 201, 202 and 203 may be formed by conductive materials for forming the gate wire.

In addition, the gate control signal wires 201, 202 and 203 may be formed by connecting two or more wires. In such a case, one of the wires may be formed by conductive materials for forming the data wire, and another of the wires may be formed by conductive materials for forming the gate wire. This wire structure could be applied to the high voltage redundancy wire. This will be explained with reference to the following drawings, FIG. 9 and FIG. 10.

Figure 9:
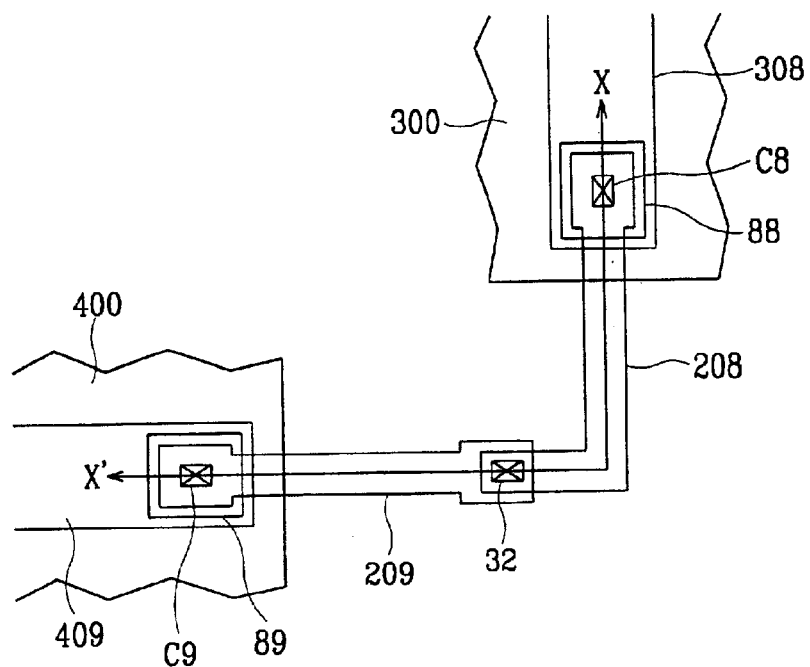
FIG. 9 is a plan view of another pattern of the signal wire of the control signal part.
Figure 10:
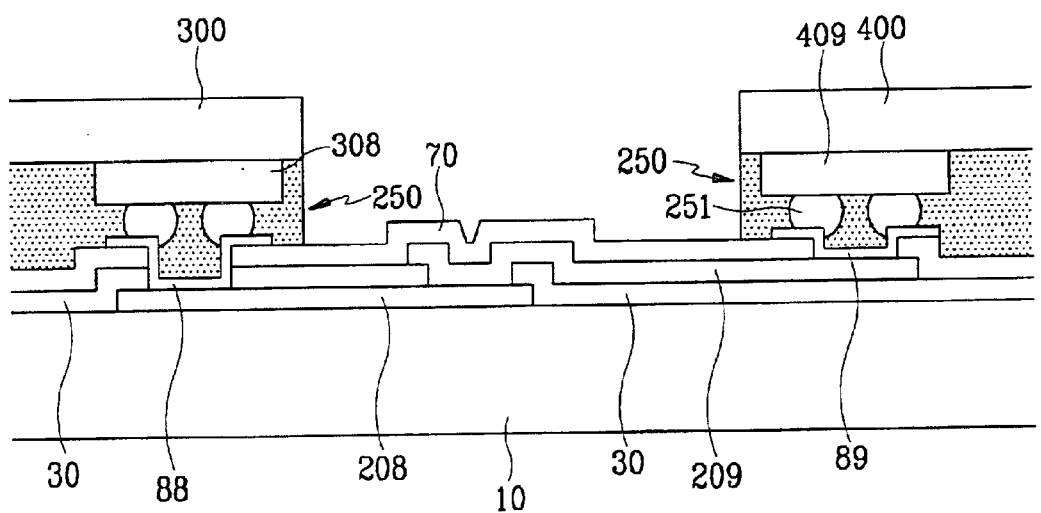
FIG. 10 is a cross sectional view of the signal wire taken along the line X–X' of FIG. 9.

FIG. 9 is a plan view of a selected gate control signal wire of the gate control signal wires, and FIG. 10 is a cross sectional view along the line X–X' of FIG. 9.

A first signal wire 208, consisting of conductive materials for forming the gate wire, is formed on the insulating substrate 10 in a first direction. The pad formed at one end of the first signal wire 208 is located at the upper portion of the substrate so as to be connected to the data signal transmission film 300.

A gate insulating layer 30, consisting of silicon nitride or silicon oxide, is formed on the insulating substrate 10 to cover the first signal wire 208.

In the gate insulating layer 30, a contact hole 32 exposing the other end of the first signal wire 208, where the pad is not located, is formed.

In addition, a second signal wire 209, consisting of conductive materials for forming the data wire, is formed on the gate insulating layer 30 in a second direction. The pad formed at one end of the second signal wire 209 is located at the left portion of the substrate to be connected to the gate signal transmission film 400. The second signal wire 209 is connected to the first signal wire 208 through the contact hole 32 so as to transmit the gate control signal from the data signal transmission film 300 to the gate transmission film 400.

A passivation layer 70, consisting of silicon nitride or silicon oxide, is formed on the gate insulating layer 30. The passivation layer 30 covers the second signal wire 209.

A contact hole C9, which exposes the pad of the second signal wire 209, is formed in the passivation layer 70, and another contact hole C8, which exposes the pad of the first signal wire 208, is formed in the passivation layer 70 and the gate insulating layer 30.

A first signal auxiliary pad 88, which is connected to the pad of the first signal wire 208 through the contact hole C8, and a second signal auxiliary pad 89, which is connected to the pad of the second signal wire 209 through the contact hole 209, are formed on the passivation layer 70.

When the data signal transmission film 300 is attached to the above described control signal part, the leads 308 of the data signal transmission film 300 is arranged and attached to the corresponding first signal auxiliary pad 88. The attachment the data transmission film 300 to the control signal part of the thin film transistor substrate is carried out through a heat and compression process using an anisotropic conducting film 250. The leads 308 of the data signal transmission film 300 are electrically connected to the first signal auxiliary pad 88 by the conductive materials 251 of the anisotropic conducting film 250. And in the same manner, the leads 409 of the gate signal transmission film 400 are arranged and attached to the corresponding second signal auxiliary pad 89. The attachment of the gate transmission film 400 to the control signal part of the thin film transistor substrate is carried out through a heat and compression process using an anisotropic conducting film 250. The leads 409 of the gate signal transmission film 400 are electrically connected to the second signal auxiliary pad 89 by the conductive materials 251 of the anisotropic conducting film 250.

In the third embodiment of the present invention, the wire structure of the connection part in which each of the leads 301, 302, 303, 310, 320, 401, 402, 403, 410 and 420 of the data transmission film 300 and the gate transmission film 400 are connected to each of the wires 201, 202, 203, 210 and 220 of the thin film transistor substrate 200, and has a sluggish slop in the step difference of the wire in order to minimize the amount of the permeated moisture. This will be explained with reference to the following drawings, FIG. 11 and FIG. 12.

Figure 11:
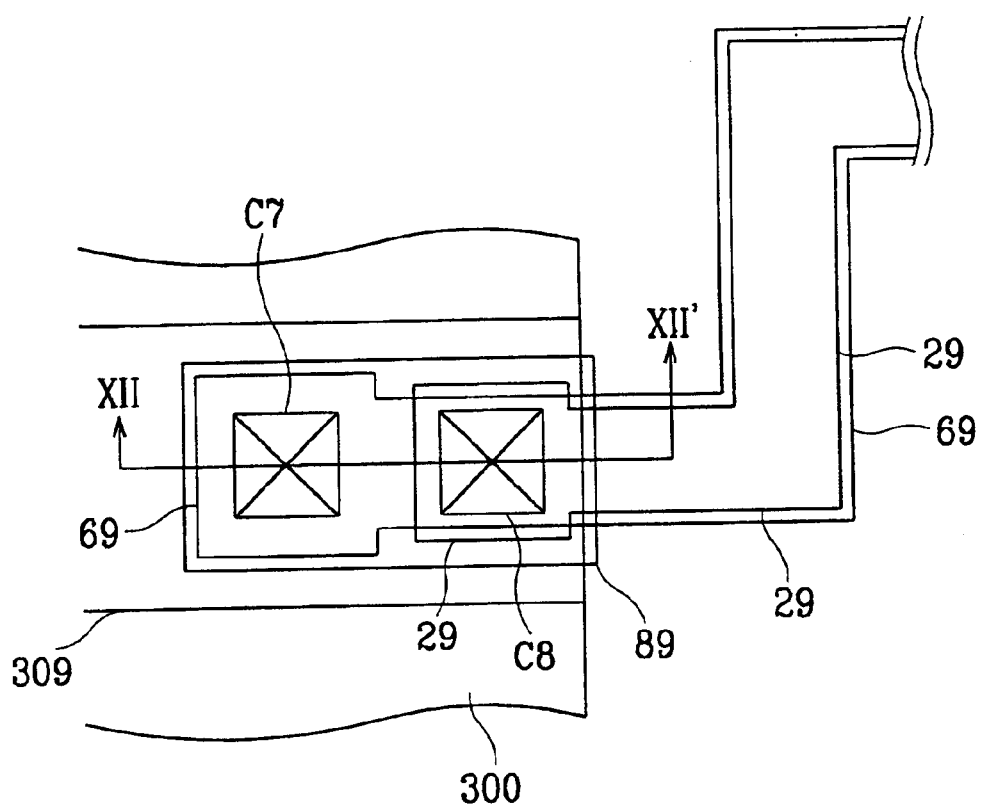
FIG. 11 is a plan view of another pattern of the pad of the signal wire.
Figure 12:
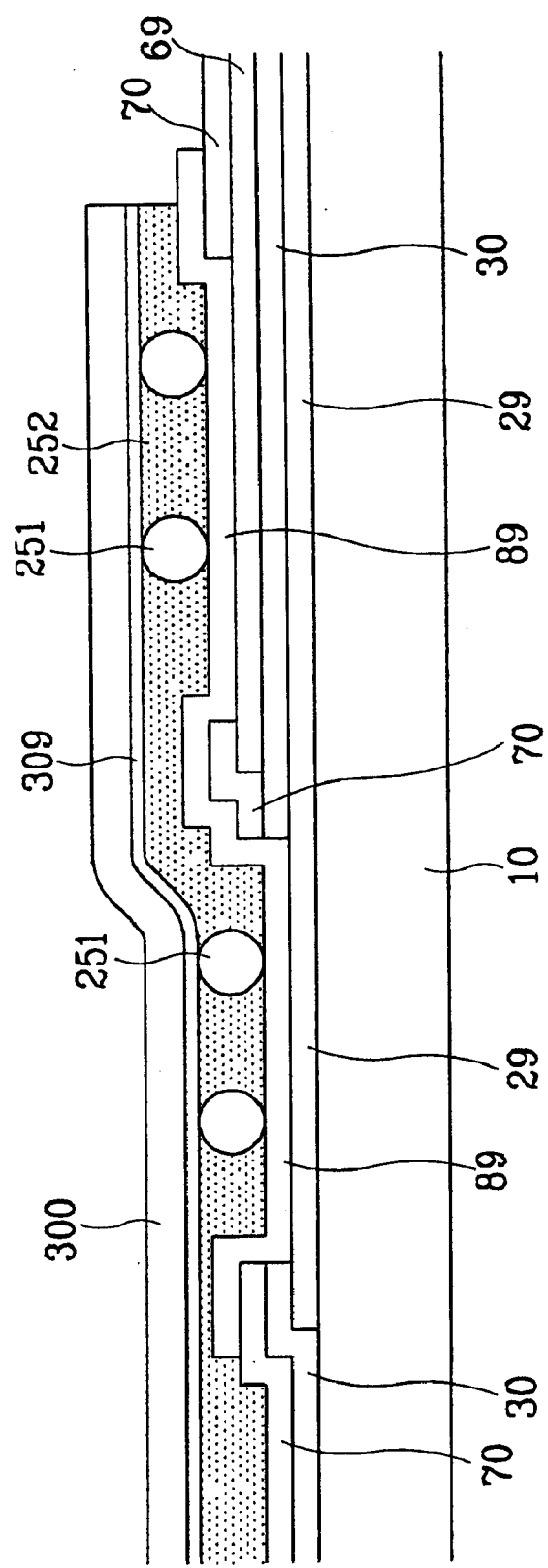
FIG. 12 is a cross sectional view of the pad taken along the line XII–XII' of FIG. 11.

FIG. 11 is a plan view of the wire structure of the connection part of the control signal wire and the lead, and FIG. 12 is a cross-sectional view along the line XII–XII' of FIG. 11. The lead is connected to each layer of the gate signal wire having a double layer type through two connection parts.

A first signal wire 29, consisting of conductive materials for forming the gate wire and having a pad at its end, is formed on an insulating substrate 10. And a gate insulating layer 30, consisting of silicon nitride and covering the first signal wire 29, is formed on the insulating substrate 10 to cover the first signal wire 29.

A second signal wire 69, consisting of conductive materials for forming the data wire and having a pad at its end, is formed on the gate insulating substrate 30. The second signal wire 69 is smaller than the first signal wire 29 so as not to reach the pad of the first signal wire 29. The second signal wire 69 follows the pattern of the first signal wire 29 so as to overlap the first signal wire 29. And a passivation layer 70, consisting of silicon nitride or silicon oxide, is formed on the gate insulating layer 30 so as to cover the second signal wire 69.

A contact hole C6, which exposes the pad of the second signal wire 69, is formed in the passivation layer 70, and another contact hole C7, which exposes the pad of the first signal wire 29, is formed in the passivation layer 80 and the gate insulating layer 30.

A control signal auxiliary pad 89, which is connected to the pads of the first and the second signal wires 29 and 69 through the contact holes C6 and C7, is formed on the passivation layer 70.

When the data signal transmission film 300 is attached to the above described control signal part, the lead 309 of the data signal transmission film 300 is arranged and attached to the corresponding control signal auxiliary pad 89. The attachment of the data signal transmission film 300 and the control signal part is carried out through a heat and compression process using an anisotropic conducting film 250. Herein, the lead 309 of the data signal transmission film 300 is electrically connected to the control signal auxiliary pad 89 of the control signal part by the conductive materials 251 in the anisotropic conducting film 250. This wire structure of the connection part may decrease the amount of the bad wire connection due to the step difference of the wire, and the opening of the wire and may minimize the amount of the permeated moisture.

In the third embodiment of the present invention, the gate control signal wires 201, 202 and 203 are formed by conductive materials for forming the data wire 60, 61, 62 and 63, and the high voltage redundancy wires 210 and 220 are formed by conductive materials for forming the gate wires 20, 21 and 22. However, the gate control signal wires 201, 202 and 203 may be formed by conductive materials for forming the gate wire 20, 21, 22 or the pixel electrode 80 besides the data wire 60, 61, 62 and 63.

Likewise, the high voltage redundancy wires 210 and 220 may be formed by conductive materials for forming the gate wire 20, 21, 22 or the pixel electrode 80 besides the data wire 60, 61, 62 and 63. Herein, the high voltage redundancy wires 210 and 220 may be formed by a conductive materials smaller than conductive materials for forming the low voltage signal wire in a tendency to oxidation, such as one from the copper family, silver family, chromium family, or molybdenum family, including nitride chromium and nitride molybdenum or, oxidized conductive material such ad ITO or IZO. In such a case, the high voltage redundancy wire may be less damaged due to the electrolysis.

In a liquid crystal display according to the fourth embodiment of the present invention, the gate control signal wires 201, 202 and 203, such as the high voltage signal wire 201, the low voltage signal wire 202 and a common voltage signal wire 203, are formed by conductive materials for forming the data wire 60, 61, 62 and 63, and the high voltage redundancy wires 210 and 220 are formed by conductive materials for forming the pixel electrode such ad ITO or IZO.

Figure 13:
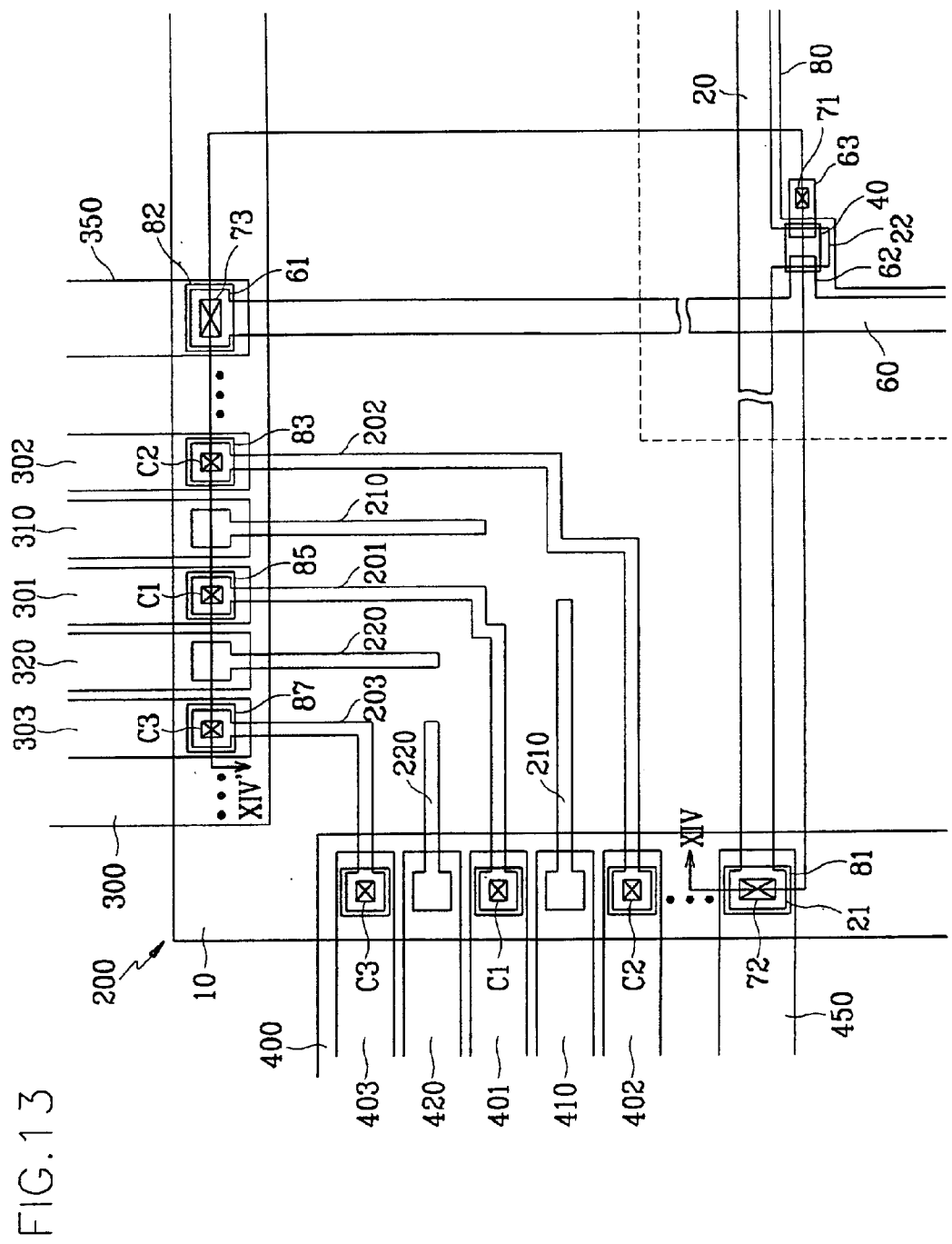
FIG. 13 is a plan view of a liquid crystal display according to a fourth embodiment of the present invention.
Figure 14:
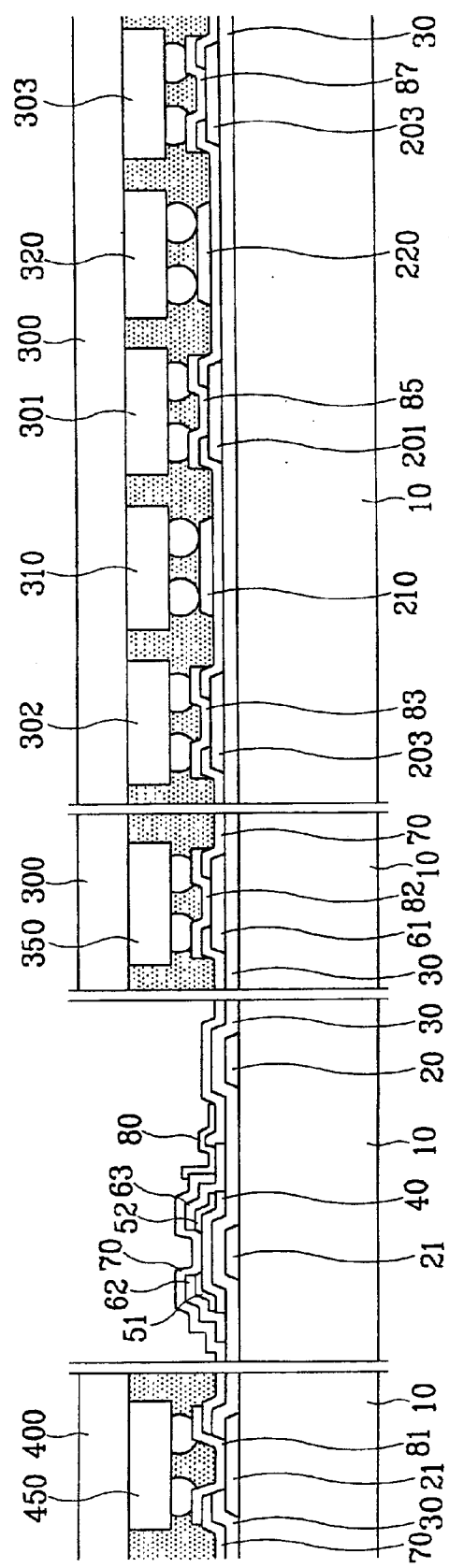
FIG. 14 is a cross sectional view of the liquid crystal display taken along the line XIV–XIV' of FIG. 13.

FIG. 13 is a plan view of a liquid crystal display according to a fourth embodiment of the present invention, and FIG. 14 is a cross sectional view of the liquid crystal display along the line XIV–XIV' of FIG. 13.

When the fourth embodiment is compared with the third embodiment of the present invention, the structure of the display region is identical but the structure of the gate control signal part is different. Accordingly, the structure of the gate control signal part will be described without a description of the structure of the display region.

A gate insulating layer 30 is formed on an insulating layer 10, and gate control signal wires 201, 202 and 203 which consist of conductive materials for forming the data wires 20, 21, 22 and 23, are formed on the insulating substrate 10. Each of the gate control signal wires 201, 202 and 203 includes a gate control signal line and gate control signal pads connected to both the sides of the gate control signal line.

Moreover, a passivation layer 70, which covers the gate control signal wires 201, 202 and 203 is formed on the gate insulating layer 30.

In the passivation layer 70, contact holes C1, C2 and C3, which exposes the pads of the gate control signal wires 201, 202 and 203, are formed. And the gate control signal auxiliary pads 85, 83 and 87, which are connected to the pads of the gate control signal wires 201, 202 and 203, are formed through the contact holes C1, C2 and C3 on the passivation layer 70.

On the passivation layer 70, the high voltage redundancy wires 210 and 220 are formed at both sides of the high voltage signal wire 201 transmitting the gate-on-voltage.

The high voltage redundancy wires 210 and 220 are formed by conductive materials for forming the pixel electrode such as ITO or IZO.

When the high voltage redundancy wires 210 and 220 are formed by ITO or IZO, as in the fourth embodiment of the present invention, the high voltage redundancy wires 210 and 220 prevent damage due to electrolysis, of not only the high voltage signal wire 201, but also prevents the damage to the high voltage redundancy wires 210 and 220.

According to the above description, the present invention forms an equipotential around of the high voltage signal wire by forming the high voltage redundancy wire. In this way, damage to the high voltage signal wire due to electrolysis is prevented. In addition, the device characteristics of the liquid crystal display are improved.

While the present invention has been described in detail with reference to the preferred embodiments, those skilled in the area will appreciate that various modifications and substitutions can be made thereto without departing from the spirit and scope of the present invention as set forth in the appended claims.

What is clamed is:

1. A wire arrangement, comprising:
    a substrate; and
    a plurality of wires formed the substrate, the plurality of wires comprising:
        a first wire transmitting a first voltage and having a first end portion;
        a second wire transmitting a second voltage smaller than the first voltage and having a second end portion; and
        a first redundancy wire having a third end portion formed between the first end portion and the second end portion.

2. The wire arrangement of claim 1, the plurality of wires further comprising a second redundancy wire having a fourth end portion, wherein the first end portion is arranged between the third end portion and the fourth end portion.

3. The wire arrangement of claim 1, wherein the first redundancy wire is connected to the first signal wire.

4. The wire arrangement of claim 1, wherein the first redundancy wire is separated from the first wire.

5. The wire arrangement of claim 2, wherein at least one of the first redundancy wire and the second redundancy wire is connected to the first wire.

6. The wire arrangement of claim 2, wherein both the first redundancy wire and the second redundancy wire are separated from the first wire.

7. The wire arrangement of claim 1, wherein the first redundancy wire is formed of a conductive material less susceptible to oxidation than the second wire.

8. The wire arrangement of claim 7, wherein the first redundancy wire is formed by a conductive material selected from the group consisting of a copper family material, a silver family material, a chromium family material, and a molybdenum family material.

9. The wire arrangement of claim 1, wherein the first redundancy wire is formed by a material selected from the group consisting of ITO and IZO.

10. The wire arrangement of claim 1, wherein the first redundancy wire transmits the same voltage as the first voltage.

11. The wire arrangement of claim 2, wherein the second redundancy wire transmits the same voltage as the first signal voltage.

12. A liquid crystal display comprising:
    a substrate;
    a display region including a gate line, a data line crossing the gate line thereby to define a pixel element region, a thin film transistor connected to the gate line and the data line in the pixel element region, and a pixel electrode electrically connected to the thin film transistor;
    a driving integrated circuit part including a gate driving integrated circuit for outputting a gate signal to the gate line and a data driving integrated circuit for outputting a data signal to the data line; and
    a control signal part for controlling the driving integrated circuit part, the control signal part including a plurality of wires comprises:
        a first signal wire transmitting a first signal voltage having a first end portion,
        a second signal wire transmitting a second signal voltage smaller than the first signal voltage and having a second end portion; and
        a first redundancy wire having a third end portion formed between the first end portion and the second end portion.

13. The liquid crystal display of claim 12, wherein the control signal part further comprises signal wires for driving the gate driving integrated circuit.

14. The liquid crystal display of claim 12, wherein the control signal part further comprises signal wires for driving the data driving integrated circuit.

15. The liquid crystal display of claim 12, wherein the first signal voltage is a gate-on-voltage or a power supply voltage.

16. The liquid crystal display of claim 12, wherein the second signal voltage is a gate-off-voltage or a ground voltage.

17. The liquid crystal display of claim 12, wherein the first redundancy wire transmits the same voltage as the first signal voltage.

18. The liquid crystal display of claim 12, further comprising a second redundancy wire having a fourth end portion, wherein the first end portion is arranged between the third end portion and the fourth end portion.

19. The liquid crystal display of claim 12, wherein the first redundancy wire is connected to the first signal wire.

20. The liquid crystal display of claim 12, wherein the first redundancy wire is separated from the first signal wire.

21. The liquid crystal display of claim 18, wherein the second redundancy wire transmits the same voltage as the first signal voltage.

22. The liquid crystal display of claim 18, wherein at least one of the first redundancy wire and the second redundancy wire is connected to the first signal wire.

23. The liquid crystal display of claim 18, wherein the first redundancy wire and the second redundancy wire are separated from the first signal wire.

24. The liquid crystal display of claim 12, wherein the first redundancy wire is formed by a conductive material less susceptible to oxidation than the second signal wire.

25. The liquid crystal display of claim 24, wherein the first redundancy wire is formed of a conductive material selected from the group consisting of a copper family material, a silver family material, a chromium family material, and a molybdenum family material.

26. The liquid crystal display of claim 12, wherein the first redundancy wire is formed of a material selected from the group consisting of ITO and IZO.

27. The liquid crystal display of claim 12, wherein the first redundancy wire is formed of a conductive material for forming the gate line.

28. The liquid crystal display of claim 12, wherein the first redundancy wire is formed of a conductive material for forming the data line.

29. The liquid crystal display of claim 12, wherein the first redundancy wire is formed of a conductive material for forming the pixel electrode.

30. The liquid crystal display of claim 12, wherein the first signal wire has a wire structure in which a first wire is connected to a second wire, the first wire being connected to the gate driving integrated circuit and the second wire being connected to the data driving integrated circuit.

31. The liquid crystal display of claim 30, wherein the first wire is formed of a conductive material for forming the gate line and the second wire is formed of a conductive material for forming the data line.

32. The liquid crystal display of claim 30, wherein the first wire is formed of a conductive material for forming the data line and the second wire is formed of a conductive material for forming the gate line.

33. The liquid crystal display of claim 12, wherein the first redundancy wire has a wire structure in which a first wire is connected to a second wire, the first wire being connected to the gate driving integrated circuit and the second wire being connected to the data driving integrated circuit.

34. The liquid crystal display of claim 33, wherein the first wire is formed of a conductive material for forming the gate line and the second wire is formed of a conductive material for forming the data line.

35. The liquid crystal display of claim 33, wherein the first wire is formed of a conductive material for forming the data line and the second wire is formed of a conductive material for forming the gate line.

36. The liquid crystal display of claim 12, wherein the signal wires of the control signal part include:

a lower wire having a pad and formed of a conductive material for forming the gate line;

a first insulating layer covering the lower wire;

a first contact hole exposing one end of the lower wire; and an upper wire having a pad and being formed of a conductive material for forming the data line, the upper wire connected to the lower wire through the first contact hole.

37. The liquid crystal display of claim 36, further comprising:

a second insulating layer covering the upper wire;

a second contact hole exposing the pad of the upper wire; end a third contact hole exposing the pad of the lower wire; and an auxiliary pad covering and connected to the pads of the lower and the upper wires through the second and third contact holes.

* * * * *

UNITED STATES PATENT AND TRADEMARK OFFICE
CERTIFICATE OF CORRECTION

PATENT NO. : 6,741,297 B2
DATED : May 25, 2004
INVENTOR(S) : Kung-Ha Moon et al.

It is certified that error appears in the above-identified patent and that said Letters Patent is hereby corrected as shown below:

Column 20,
Line 22, delete the term "end".

Signed and Sealed this

Twenty-third Day of November, 2004

JON W. DUDAS
*Director of the United States Patent and Trademark Office*